United States Patent Office 3,799,893
Patented Mar. 26, 1974

3,799,893
METHYLENE PHOSPHONATES OF GLYCIDYL
REACTED POLYAMINES
Patrick M. Quinlan, Webster Groves, Mo., assignor to
Petrolite Corporation, Wilmington, Del.
No Drawing. Filed Mar. 31, 1971, Ser. No. 129,955
Int. Cl. C08g 43/00
U.S. Cl. 260—2 BP
4 Claims

ABSTRACT OF THE DISCLOSURE

Methylene phosphonates of glycidyl reacted polyalkylene polyamines and to uses therefor, particularly as scale inhibitors, chelating agents, etc.

---

Most commercial water contains alkaline earth metal cations, such as calcium, barium, magnesium, etc., and anions such as bicarbonate, carbonate, sulfate, oxalate, phosphate, silicate, fluoride, etc. When combinations of these anions and cations are present in concentrations which exceed the solubility of their reaction products, precipitates form until their product solubility concentrations are no longer exceeded. For example, when the concentrations of calcium ion and carbonate ion exceed the solubility of the calcium carbonate reaction product, a solid phase of calcium carbonate will form as a precipitate.

Solubility product concentrations are exceeded for various reasons, such as evaporation of the water phase, change in pH, pressure or temperature, and the introduction of additional ions which can form insoluble compounds with the ions already present in the solution.

As these reaction products precipitate on the surfaces of the water-carrying system, they form scale. The scale prevents effective heat transfer, interferes with fluid flow, facilitates corrosive processes, and harbors bacteria. Scale is an expensive problem in many industrial water systems, causing delays and shutdowns for cleaning and removal.

Scale-forming compounds can be prevented from precipitating by inactivating their cations with chelating of sequestering agents, so that the solubility of their reaction products is not exceeded. Generally, this approach requires many times as much chelating or sequestering agent as cation present, and the use of large amounts of treating agent is seldom desirable or economical.

More than twenty-five years ago it was discovered that certain inorganic polyphosphates would prevent such precipitation when added in amounts far less than the concentrations needed for sequestering or chelating. See, for example, Hatch and Rice, "Industrial Engineering Chemistry," vol. 31, p. 51, at 53; Reitemeir and Buchrer, "Journal of Physical Chemistry," vol. 44, No. 5, p. 535 at 536 (May 1940); Fink and Richardson U.S. Patent 2,358,222; and Hatch U.S. Patent 2,539,305. When a precipitation inhibitor is present in a potentially scale-forming system at a markedly lower concentration than that required for sequestering the scale forming cation, it is said to be present in "threshold" amounts. Generally, sequestering takes place at a weight ratio of threshold active compound to scale-forming cation component of greater than about ten to one, and threshold inhibition generally takes place at a weight ratio of threshold active compound to scale-forming cation component of less then about 0.5 to 1.

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents, although sequestering agents are not necessarily "threshold" compounds. Thus, there is an intermediate zone between the high concentrations at which threshold active compounds sequester the cations of relatively insoluble compounds and the low concentrations at which they act as threshold inhibitors. Therefore, one could also define "threshold" concentrations as all concentrations of threshold active compounds below that concentration at which this turbid zone or precipitate is formed. Generally the threshold active compound will be used in a weight ratio of the compound to the cation component of the scale-forming salts which does not exceed about 1.

The polyphosphates are generally effective threshold inhibitors for many scale-forming compounds at temperatures below 100° F. But after prolonged periods at higher temperatures, they lose some of their effectiveness. Moreover, in an acid solution, they revert to ineffective or less effective compounds.

A compound that has sequestering powers does not predictably have threshold inhibiting properties. For example, ethylene diamine tetracetic acid salts are powerful sequesterants but have no threshold activities.

I have now discovered a process for inhibiting scale such as calcium, barium and magnesium carbonate, sulfate, silicate, etc., scale which comprises employing threshold amounts of methylene phosphonates of glycidyl reacted polyalkylene polyamines.

The amines employed herein are polyalkylenepolyamines, for example, of the formula

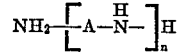

where $n$ is an integer, for example, 1 to 25 or more, such as 2–10, but preferably 2–5, etc., and A is an alkylene group—$(CH_2)_m$— where $m$ is 2–10 or more, but preferably ethylene or propylene.

One or more of the hydrogens on the $CH_2$ group may be substituted for example, by such groups as alkyl groups, for example, methyl, ethyl, etc. Examples of A include

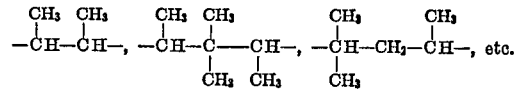

Examples of polyamines include the following: ethylene diamine, diethylene triamine, dipropylene triamine, triethylene tetramine, tripropylene tetramine, tetraethylene pentamine, tetrapropylene pentamine, polyalkyleneimines, i.e., the higher molecular weight amines derived from alkyleneimine such as polyethyleneimines, polypropyleneimines, for example having 50, 100 or more alkylene amino units, etc. Mixtures of the above polyamine amines and those polyamines containing both ethylene and propylene groups, for example.

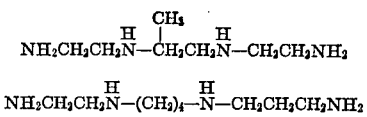

etc., can be employed.

These include the following:

$$NH_2CH_2CH_2NH_2$$

$$NH_2(CH_2CH_2\overset{H}{N})_2H$$

$$NH_2-(CH_2CH_2\overset{H}{N})_3-H$$

$$NH_2-(CH_2CH_2\overset{H}{N})_4-H$$

$$NH_2-(CH_2CH_2\overset{H}{N})_5-H$$

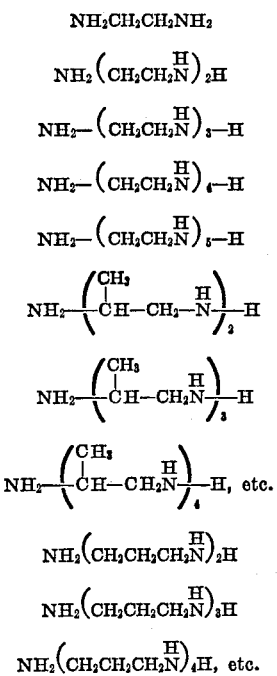

$$NH_2(CH_2CH_2CH_2\overset{H}{N})_2H$$

$$NH_2(CH_2CH_2CH_2\overset{H}{N})_3H$$

$$NH_2(CH_2CH_2CH_2\overset{H}{N})_4H, \text{ etc.}$$

The polyalkylene polyamines are reacted with glycidyl compounds of the general formulas:

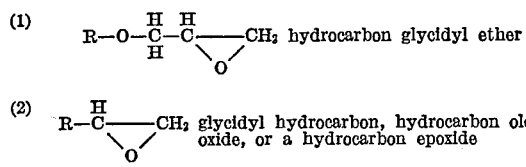

where R is a substituted group such as a hydrocarbon group, for example, alkyl, aryl, alkaryl, aralkyl, cycloalkyl, etc.

In the preferred embodiment R is a hydrocarbon group having about 4–32 carbons, as about 4 to 22 carbons, but preferably from about 4 to 18 carbons where the hydrocarbon is alkyl or aryl.

The substituted polyamines suitable as intermediates for the preparation of the compounds of this invention may be prepared by the slow addition of an olefin oxide or glycidyl epoxide to the warmed polyamine according to the following general type reactions:

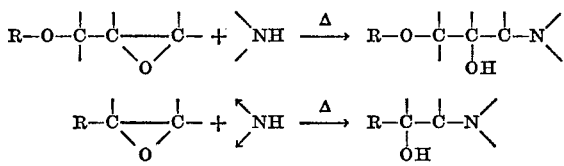

The following table illustrates glycidyl compounds suitable for use in this invention.

TABLE I

Glycidyl compounds

Ex.  $CH_2\underset{O}{-}CH-Z$

Z

1. $C_4H_9-O-CH_2-$
2. $C_6H_{13}-O-CH_2-$
3. 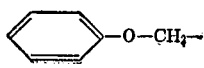—O—CH$_2$—

4. nonyl—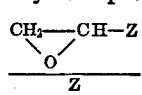—O—CH$_2$—

5. $CH_3-\underset{\underset{CH_3}{|}}{\overset{\overset{CH_3}{|}}{C}}$—⟨⟩—O—CH$_2$—

6. ⟨⟩—O—CH$_2$CH$_2$—O—CH$_2$—

7. R—O—CH$_2$—(Procter and Gamble Epoxide No. 7)
   R is mixed $C_{8-10}$ hydrocarbon
8. R—O—CH$_2$—(Procter and Gamble Epoxide No. 8)
   R is a mixed $C_{12-14}$ hydrocarbon
9. R—O—CH$_2$—(Procter and Gamble Epoxide No. 45)
   R is a mixed $C_{16-18}$ hydrocarbon
10. R—O—CH$_2$—(ADM Nedox 1518)
    R is a mixed $C_{15-18}$ hydrocarbon
11. R—O—CH$_2$—(ADM Nedox 1114)
    R is a mixed $C_{11-14}$ hydrocarbon
12. R—O—CH$_2$—(Union Carbide Olefin oxide 1416)
    R is a mixed $C_{14-16}$ hydrocarbon The amount of glycidyl compound reacted will depend on the particular polyamine, the number of methylene phosphonates desired in the final product, the system in which it is employed, etc. In general, less than all of the nitrogen-bonded hydrogens are reacted so as to leave hydrogens which are capable of being phosphomethylolated. Reaction with the glycidyl compound is carried out in the conventional manner.

The glycidyl reaction product of polyalkylene polyamine is then phosphomethylolated. This is preferably carried out by the Mannich type reaction as illustrated in the following reaction where —NH indicates at least one reactive group on the polyamine.

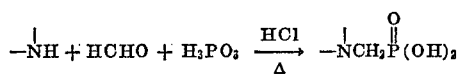

The Mannich reaction is quite exothermic and initial cooling will generally be required. Once the reaction is well underway, heat may be required to maintain refluxing conditions. While the reaction will proceed at temperatures over a wide range, i.e., from 80 to 150° C., it is preferred that the temperatures of the reaction medium be maintained at the refluxing temperatures. The reaction is preferably conducted at atmospheric pressure, although sub-atmospheric and superatmospheric pressures may be utilized if desired. Reaction times will vary, depending upon a number of variables, but the preferred reaction time is 1 to 5 hours, and the most preferred reaction time is 2½ to 3½ hours.

Although the phosphonic acid or the formaldehyde may be added in either order, or together, to the reaction mixture, it is preferred to add the phosphonic acid to the polyamine and then to slowly add the formaldehyde under refluxing conditions. Generally, about ½ to 10 moles or more of formaldehyde and about ½ to 10 moles or more of phosphonic acid can be used per mole equivalent of amine, although the most preferred molar equivalent ratios of formaldehyde: phosphonic acid: amine is 1:1:1. Excess formaldehyde and/or phosphonic acid function essentially as solvents, and thus there is no real upper limit on the amount of these materials which may be used, per mole equivalent of amine, although such excess amounts naturally add to the cost of the final product and are therefore not preferred. The preferred molar equivalent ratios are ½ to 2 moles each of the formaldehyde and phosphonic acid per mole equivalent of amine.

The Mannich reaction will proceed in the presence or absence of solvents. The reaction may be carried out as a liquid-phase reaction in the absence of solvents or diluents, but is preferred that the reaction be carried out in an aqueous solution containing from about 40 to about 50% of the reaction monomers. Preferred conditions for the Mannich reaction include the use of formaldehyde based on the molar equivalent amount of the amine compound, the use of a stoichiometric amount of phosphonic acid based on the molar equivalent amount of amine (e.g., on the amine active hydrogen content), refluxing conditions and a pH of less than 2 and preferably less than 1.

Although formaldehyde is preferred, other aldehydes or ketones may be employed in place of formaldehyde such as those of the formula

where R and R' are hydrogen, or a hydrocarbon group such as alkyl, i.e., methyl, ethyl, propyl, butyl, etc., aryl, i.e., phenyl, alkylphenyl, phenalkyl, etc., cycloalkyl, i.e., cyclohexyl, etc.

The compound can also be prepared by a modified Mannich reaction by employing a chloromethylene phosphonate

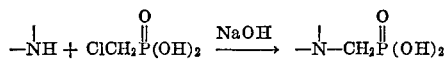

Thus, the compositions of this invention are prepared by (1) Reacting glycidyl compounds with alkylene polyamine to the desired degree while leaving some unreacted NH groups.

(2) Phosphomethylolating the glycidyl reaction product of the polyamine so that at least one, or all of the NH groups, or less than all of the groups are phosphomethylolated.

The final reaction product may be summarized by the following idealized formulas:

(1) 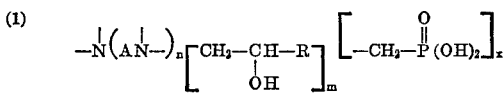

(2) 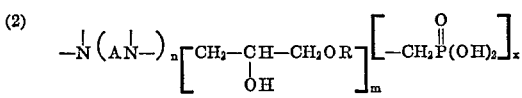

wherein $n$ is 1–25, $m+x$ equals the sum of the valences on the polyamine (i.e., $n+2$) with the proviso each has a value of at least one. Where less than all of the nitrogen-bonded hydrogens are reacted either by reaction with the glycidyl compound or phosphomethylolating they will remain as hydrogen atoms.

In general, it is preferred that at least 50% and preferably at least 80% of the nitrogen-bonded hydrogens of the polyamine be replaced by methylene phosphonate groups and the remainder of the nitrogen-bonded hydrogens reacted with the glycidyl compound, preferably with 1 to 2 glycidyl units per polyamine. Or, stated another way, by the formula

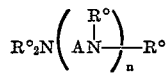

where the R° groups are glycidyl reaction units or

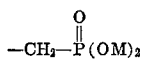

where at least 50% and preferably 80% of the R° groups are

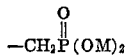

where $n$, A have the meanings stated herein, i.e., $n=1-25$, but preferably 2–5, A is alkylene, preferably ethylene, and M is hydrogen or a salt moiety.

Scale formation from aqueous solutions containing an oxide variety of scale forming compounds, such as calcium, barium and magnesium carbonate, sulfate, silicate, oxalates, phosphates, hydroxides, fluorides and the like are inhibited by the use of threshold amounts of the compositions of this invention which are effective in small amounts, such as less than 100 p.p.m., and are preferably used in concentrations of less than 25 p.p.m.

The compounds of the present invention (e.g., the acid form of the compounds) may be readily converted into the corresponding alkali metal, ammonium or alkaline earth metal salts by replacing at least half of the hydrogen ions in the phosphonic acid group with the appropriate ions, such as the potassium ion or ammonium or with alkaline earth metal ions which may be converted into the corresponding sodium salt by the addition of sodium hydroxide. If the pH of the amine compound is adjusted to 7.0 by the addition of caustic soda, about one half of the —OH radicals on the phosphorous atoms will be converted into the sodium salt form.

The scale inhibitors of the present invention illustrate improved inhibiting effect at high temperatures when compared to prior art compounds. The compounds of the present invention will inhibit the deposition of scale-forming alkaline earth metal compounds on a surface in contact with aqueous solution of the alkaline earth metal compounds over a wide temperature range. Generally, the temperatures of the aqueous solution will be at least 40° F., although significantly lower temperatures will often be encountered. The preferred temperature range for inhibition of scale deposition is from about 130 to about 350° F. The aqueous solutions or brines requiring treatment generally contain about 50 p.p.m. to about 50,000 p.p.m. of scale-forming salts. The compounds of the present invention effectively inhibit scale formation when present in an amount of from 0.1 to about 100 p.p.m., and preferably 0.2 to 25 p.p.m. wherein the amounts of the inhibitor are based upon the total aqueous system. There does not appear to be a concentration below which the compounds of the present invention are totally ineffective. A very small amount of the scale inhibitor is effective to a correspondingly limited degree, and the threshold effect is obtained with less than 0.1 p.p.m. There is no reason to believe that this is the minimum effective concentration. The scale inhibitors of the present invention are effective in both brine, such as seawater, and acid solutions.

In the specific examples the general method of phosphomethylolation is that disclosed in Netherlands Patent 6407908 and 6505237 and in the Journal of Organic Chemistry, vol. 31, No. 5, 1603–1607 (May 1966). These references are hereby incorporated by reference.

In general, the method consists of the following: The glycidyl reacted polyamine is slowly added with cooling to the mixture of phosphonic and hydrochloric acids. After the addition is completed, the reaction mixture is heated to 100°–110° C. and the aqueous formaldehyde is slowly added over a period of 1 to 1½ hours while maintaining a temperature of 100°–110°. After the addition is completed, the reaction mixture is held at reflux temperatures of 1–2 additional hours. The preferred molar equivalent ratios are ½–2 moles each of the formaldehyde and phosphonic acid per mole equivalent of amine, although the most preferred molar equivalent ratios of formaldehyde: phosphonic acid: amine is 1:1:1.

The preferred amine reactants to be used in the preparation of the amino methylene phosphonic acids of the present invention are essentially glycidyl reacted polyamines. Suitable polyamines include the following: diethylene triamine, triethylene tetramine, tetraethylene pentamine, pentaethylene hexamine, ditetramethylene triamine, tritetramethylene tetramine, dihexamethylene triamine and the like. Linear polyamine mixtures that may be reacted are Amine E–100 from Dow Chemical Company, Amine #1 from Jefferson Chemical Company, and Amine #248 from E. I. Du Pont and Company, are also desirable from an economic standpoint. Other suitable amines are polyethyleneimines such as the "PEI" series from Dow Chemical.

The preparation of the glycidyl reacted polyamine methylene phosphonic acids of this invention is illustrated in the following examples.

EXAMPLE 1

To a solution of 16.6 g. of phosphorous acid in 20 ml. of water, and 22 g. of concentrated hydrochloric acid, was slowly added 24 g. of the reaction product of P & G Epoxide No. 8 (1 mole) with tetraethylene-pentamine (1 mole). The solution was heated to reflux, and 18 g. of 37% aqueous formaldehyde solution was added dropwise over a period of 1½ hours. The resulting foamy solution was then held at reflux for an additional two hours.

The acid was obtained by concentration of the reaction mixture. It was a hard brittle resin like solid that foamed in water. The calcium salt of the acid had good solubility in organic solvents.

EXAMPLE 2

To a solution of 16.6 g. of phosphorus acid, 17 ml. of water, and 22 g. of concentrated hydrochloric acid, was slowly added a solution of 24 g. of the reaction product of ADM Chemical Nedox 1518 (1 mole) with diethylenetriamine (1 mole) in 50 ml. of t-butyl alcohol. The resulting solution was heated to reflux and 18 g. of 37% aqueous formaldehyde was slowly added over a period of 1½ hours. The resulting solution was refluxed for an additional two hours. The acid was obtained by concentration of the reaction mixture. It was a hard resin like solid that foamed in water. The barium salt of the acid displayed excellent solubility in organic solvents.

EXAMPLE 3

To a solution of 16.6 g. of phosphorous acid in 20 ml. of water and 22 g. of concentrated hydrochloric acid was slowly added 22.3 g. of the reaction product of butyl glycidyl ether (2 moles) with tetraethylenepentamine (1 mole). The resulting solution was heated to reflux and 18 g. of 37% aqueous formaldehyde was slowly added over a period of two hours. The resulting solution was heated at reflux for an additional two hours.

EXAMPLE 4

To a solution of 16.6 g. of phosphorous acid in 20 ml. of water, and 22 g. of concentrated hydrochloric acid, was slowly added 22.1 g. of the reaction product of phenyl glycidyl ether (2 moles) with triethylenetetramine (1 mole). The resulting solution was heated to reflux and 18 g. of 37% aqueous formaldehyde was slowly added over a period of two hours. The resulting solution was further refluxed for an additional two hours.

Table II illustrates further examples of glycidyl reacted alkylene polyamines.

TABLE II

| Ex. | Polyamine (1 mole) | Epoxide (moles) added to polyamine |
|---|---|---|
| 5 | Tetraethylenepentamine | t-Butyl-phenyl glycidyl ether (1 mole). |
| 6 | Diethylenetriamine | Union Carbide Olefin Oxide 1416 (1 mole). |
| 7 | Pentaethylenehexamine | Hexyl glycidyl ether (2 moles). |
| 8 | Triethylenetetramine | P & G Epoxide No. 45 (1 mole). |
| 9 | Dow Amine E-100 | ADM Chemical Nedox 1114 (1 mole). |

The degree of phosphomethylolation can be controlled by varying the molar ratios of the reactants. However, for effective scale inhibition, I have found that the maximum degree of phosphomethylolation is to be preferred. In other words, a complete replacement of the remaining active hydrogen atoms on the glycidyl reacted alkylene polyamines by methylene phosphonate groups has been found to be most desirable for scale inhibition.

These methylene phosphonates are threshold active scale inhibitors at room temperature, and are also effective at elevated temperatures. They also retain their effectiveness in acid and salt solution and have excellent solubility in waters with high hardness content.

Calcium scale inhibition test

The procedure utilized to determine the effectiveness of my scale inhibitors in regard to calcium scale is as follows:

Several 50 ml. samples of a 0.04 sodium bicarbonate solution are placed in 100 ml. bottles. To these solutions is added the inhibitor in various known concentrations. 50 ml. samples of a 0.02 M $CaCl_2$ solution are then added.

A total hardness determination is then made on the 50–50 mixture utilizing the well known Schwarzenbach titration. The samples are placed in a water bath and heated at 180° F. 10 ml. samples are taken from each bottle at 2 and 4 hour periods. These samples are filtered through millipore filters and the total hardness of the filtrates are determined by titration.

$$\frac{\text{Total hardness after heating}}{\text{Total hardness before heating}} \times 100 = \text{percent inhibition}$$

Table III describes the scale inhibition test results.

TABLE III

[Inhibitions of scale formation from a $CaCO_3$ solution at 180° F. for 4 hours (200 p.p.m. $CaCO_3$)]

| Inhibitor | Salt | Conc., p.p.m. | Percent scale inhibition |
|---|---|---|---|
| Example 1 | H | 50 | 65 |
|  | H | 20 | 46 |
|  | Na | 50 | 55 |
|  | Na | 20 | 40 |
| Example 2 | H | 50 | 67 |
|  | H | 20 | 55 |
|  | Na | 50 | 60 |
|  | Na | 20 | 52 |
| Example 3 | H | 50 | 64 |
|  | H | 20 | 48 |
|  | Na | 50 | 57 |
|  | Na | 20 | 42 |
| Example 4 | H | 50 | 63 |
|  | H | 20 | 42 |
|  | Na | 50 | 57 |
|  | Na | 20 | 47 |
| Commercial organic phosphate inhibitor | Na | 50 | 40 |
|  | Na | 20 | 35 |
| Commercial organic phosphonate inhibitor | Na | 50 | 42 |
|  | Na | 20 | 35 |

Use in the chelation or sequestration of metal ions

The chelating or sequestering agents of the present invention are of wide utility such as when it becomes necessary to sequester or inhibit the precipitation of metal cations from aqueous solutions. Among their many uses are the following applications:

Soaps and detergents, textile processing, metal cleaning and scale removal, metal finishing and plating, rubber and plastics industry, pulp and paper industry, oil-well treatment, chelation in biological systems.

An important function of these compounds is their ability to sequester $Fe^{+2}$. In secondary oil recovery by means of water floods, waters are frequently mixed on the surface prior to injection. Frequently these waters contain amounts of $Fe^{+2}$ and $H_2S$. If these incompatible waters are mixed, an FeS precipitate results which can plug the sand face of the injection well. Another of their functions is to prevent formation of gelatinous iron hydroxides in the well and in the effluent production waters.

To demonstrate the effectiveness of the glycidyl reacted polyamines methylene phosphonic acids in chelating $Fe^{+2}$, the following test procedure was utilized. Into a flask that contained a known concentration of the sequestering agent, and enough sodium hydroxide or hydrochloric acid to give the desired pH was placed a 100 ml. aqueous sample of ferrous ammonium sulfate (20 p.p.m. of $Fe^{+2}$), after final pH adjustment the solution was allowed to remain at ambient temperatures for 48 hours. The solution was centrifuged for one hour to remove colloidal iron hydroxide and an aliquot of the supernatant solution was analyzed by atomic absorption to determine the iron concentration.

The following table illustrates the ability of the sequestering agents of the present invention to sequester $Fe^{+2}$, as compared to the well known sequestering agent tetrasodium ethylenediamine tetra-acetate (EDTA).

TABLE IV

| pH | Sequestering agent Product, example— | P.p.m. | Amount of iron sequestered (p.p.m.) |
|---|---|---|---|
| 5 | 1 | (50) | (19) |
|   | 2 | (50) | (19) |
|   | 3 | (50) | (18) |
|   | EDTA | (50) | (7) |
| 7 | 1 | (50) | (19) |
|   | 2 | (50) | (17) |
|   | 3 | (50) | (18) |
|   | EDTA | (50) | (7) |
| 10 | 1 | (150) | (17) |
|    | 2 | (150) | (17) |
|    | 3 | (150) | (20) |
|    | EDTA | (150) | (6) |

As one can observe from the preceding table, the sequestering agents of this invention are as effective, and in some cases superior, to EDTA when tested over a wide pH range.

The sequestering agents of this invention are also quite effective in sequestering other metal cations in aqueous solutions. For example, a test was conducted in which 60 p.p.m. of the sequesterant were dissolved in 100 ml. of water. The pH was adjusted to 9 and maintained there. Metal cations were added, in the following amounts, before a noticeable precipitate was formed.

TABLE V

| Sequesterant | | Metal (p.p.m.) sequestered per 60 p.p.m. of sequesterant |
|---|---|---|
| Product, example: | | |
| 1 | $Fe^{+3}$ | (60) |
| 1 | $Al^{+3}$ | (120) |
| 1 | $Cu^{+2}$ | (120) |
| 1 | $Ni^{+2}$ | (50) |
| 3 | $Fe^{+3}$ | (60) |
| 3 | $Al^{+3}$ | (120) |
| 3 | $Cu^{+2}$ | (120) |
| 3 | $Ni^{+3}$ | (60) |

Other heavy metals sequestered by the sequestering agents of this invention such as cobalt, manganese, chromium and the like.

In summary, the products of this invention are glycidyl reacted phosphomethylolated polyalkylene polyamines having at least three amino units. Reaction is preferably carried out with a glycidyl compound of the formula

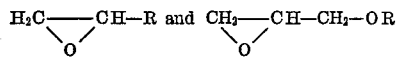

where R had at least about 4 carbons but preferably about 4 to 18 carbons. The phosphomethylolated groups, i.e.,

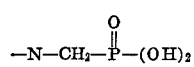

(or salts thereof) preferably comprise at least 50% but most preferably at least about 80% of the available nitrogen-bonded hydrogens on the polyamine, the remaining nitrogen-bonded hydrogens being preferably nitrogen-bonded glycidyl reacted groups. The preferred polyalkylene polyamine has 2–25 such as 2–10 nitrogen units and most preferably 2–5 nitrogen units—the preferred embodiment being polyethylene polyamines. These compositions are employed as scale inhibitors, chelating agents, and the like. Various modifications will be evident to those skilled in the art.

The terms "phosphonic acid" and "phosphorous acid" may be used interchangeably and relate to $H_3PO_3$, i.e.,

The terms "olefin oxide," "epoxide," and "glycidyl" are used interchangeably to describe the

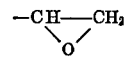

group. Thus alkyl glycidyl, alkyl olefin oxide or epoxide are

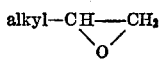

and alkyl glycidyl ether is

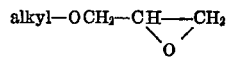

Other glycidyl compounds are correspondingly named.

As is quite evident, new glycidyl compounds will be constantly developed which could be useful in my invention. It is, therefore, not only impossible to attempt a comprehensive catalogue of such compounds, but to attempt to describe the invention in its broader aspects in terms of specific glycidyl compound used would be too voluminous and unnecessary since one skilled in the art could by following the description of the invention herein select a useful glycidyl ether and react it. To precisely define each specific useful glycidyl compound in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific glycidyl compounds suitable for this invention by applying them in the invention set forth herein. In analogy to the case of a machine, wherein the use of certain materials of construction or dimensions of parts would lead to no practical useful result, various materials will be rejected as inapplicable where others would be operative. I can obviously assume that no one will wish to employ a useless glycidyl compound nor will be misled because it is possible to misapply the teachings of the present disclosure to do so. Thus, any glycidyl compound which can be reacted with polyamine and then phosphomethylolated can be employed.

Having thus described my invention, what I claim as new and desire by Letters Patent is:

1. Methylene phosphonates of glycidyl reacted polyalkylene polyamines, said methylene phosphonates of glycidyl reacted polyalkylene polyamines having nitrogen-bonded methylene phosphonate units and nitrogen-bonded glycidyl reacted units, said methylene phosphonates being of the formula

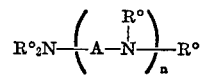

where $n$ is 1–100,

A is

where $m$ is 2–10 and

X is hydrogen or alkyl, with the proviso that A is the same or different when $n$ is 2, or more, and R° is a methylene phosphonate unit, glycidyl reacted unit or hydrogen.

2. The methylene phosphonates of glycidyl reacted polyalkylene polyamines of claim 1 where the nitrogen-bonded glycidyl reacted unit is

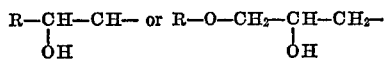

and R is a hydrocarbon group.

3. The methylene phosphonates of glycidyl reacted polyalkylene polyamines of claim 2 where $n$ is 2–5, $m$ is 2, and X is hydrogen.

4. The methylene phosphonates of glycidyl reacted polyalkylene polyamines of claim 3 having the formulae

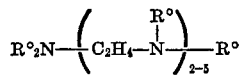

wherein R° is a methylene phosphonate unit or a glycidyl reacted unit and at least 80% of the R° units are methylene phosphonate units.

References Cited

UNITED STATES PATENTS 2,841,611  7/1958  Bersworth _____ 260—2 P

OTHER REFERENCES

Handbook of Epoxy Resins, Lee et al., 1967 (p. 7–15). TP1180.E6L4.

Chem. Abstract, vol. 64, 1966, p. 12913c.

WILLIAM H. SHORT, Primary Examiner

T. E. PERTILLA, Assistant Examiner

U.S. Cl. X.R.

8—137; 19—200; 29—81; 162—48; 252—82, 89, 110, 180; 260—2 P, 3, 47 EP, 72 R, 502.5 R, 944

UNITED STATES PATENT OFFICE
CERTIFICATE OF CORRECTION

Patent No. 3,799,893         Dated  March 26, 1974

Inventor(s) Patrick M. Quinlan

It is certified that error appears in the above-identified patent and that said Letters Patent are hereby corrected as shown below:

Column 3, lines 53 through 55: The formula following the arrow should read

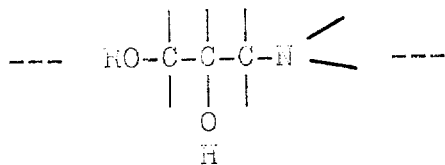

lines 56 through 59: The formula following the arrow should read

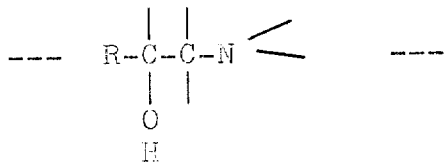

UNITED STATES PATENT OFFICE
CERTIFICATE OF CORRECTION

Patent No. 3,799,893     Dated March 26, 1974

Inventor(s) Patrick M. Quinlan     Page 2

It is certified that error appears in the above-identified patent and that said Letters Patent are hereby corrected as shown below:

Column 11, lines 4 and 5: The first formula should read

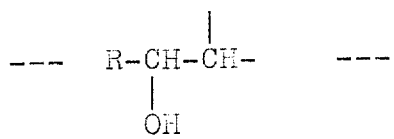

Signed and Sealed this thirtieth Day of September 1975

[SEAL]

Attest:

RUTH C. MASON
*Attesting Officer*

C. MARSHALL DANN
*Commissioner of Patents and Trademarks*